United States Patent
Chang et al.

(10) Patent No.: US 12,497,002 B2
(45) Date of Patent: Dec. 16, 2025

(54) BONELESS WIPER STRUCTURE

(71) Applicant: DANYANG UPC AUTO PARTS CO., LTD., Jiangsu (CN)

(72) Inventors: Chuan-Chih Chang, New Taipei (TW); Che-Wei Chang, New Taipei (TW); Cheng-Kai Yang, New Taipei (TW)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 18/225,297

(22) Filed: Jul. 24, 2023

(65) Prior Publication Data

US 2025/0033600 A1    Jan. 30, 2025

(51) Int. Cl.
*B60S 1/38* (2006.01)
*B60S 1/40* (2006.01)

(52) U.S. Cl.
CPC .......... *B60S 1/3858* (2013.01); *B60S 1/3849* (2013.01); *B60S 1/3851* (2013.01); *B60S 1/3867* (2013.01);
(Continued)

(58) Field of Classification Search
CPC .... B60S 1/3851; B60S 1/3849; B60S 1/3853; B60S 1/3858; B60S 1/3856; B60S 1/3848;
(Continued)

(56) References Cited

U.S. PATENT DOCUMENTS 11,820,336 B2 * 11/2023 Poton .................. B60S 1/40
2013/0192016 A1 * 8/2013 Kim .................... B60S 1/0408
                                                15/250.201
(Continued)

FOREIGN PATENT DOCUMENTS

CN    201249748    *  6/2009
CN    105253107 A     1/2016
(Continued)

OTHER PUBLICATIONS

Machine language translation of description portion of EP publication 2450244, published May 2012 (Year: 2012).*
(Continued)

*Primary Examiner* — Katina N. Henson
(74) *Attorney, Agent, or Firm* — HDLS IPR SERVICES; Chun-Ming Shih

(57) ABSTRACT

A boneless wiper structure (10) for a wiper arm (3) includes a wiper blade (1) and a connection base assembly (2). The wiper blade (1) is provided with two positioning holes. The connection base assembly (2) includes a fixing base (21) and a joint base (22). The fixing base (21) is assembled to the wiper blade (1). Two positioning feet (211) extend from a bottom of the fixing base (21) for engagement with the two positioning holes (11). A top of the fixing base (21) includes a containing groove (212) and a first engagement groove (213) and a second engagement groove (214) arranged on a front side and a rear side of the containing groove (212). The joint base (22) is engaged with the containing groove (212). A block (221) extends from one end of the joint base (22) to engage with the first engagement groove (213).

8 Claims, 8 Drawing Sheets

(52) U.S. Cl.
CPC ........... *B60S 1/3879* (2013.01); *B60S 1/3891* (2013.01); *B60S 1/4019* (2013.01)

(58) Field of Classification Search
CPC .... B60S 1/3865; B60S 1/3867; B60S 1/4009; B60S 1/4016; B60S 1/4019; B60S 1/3889; B60S 1/3891
USPC .................................................. 15/250.361
See application file for complete search history.

(56) References Cited

U.S. PATENT DOCUMENTS

| | | | | |
|---|---|---|---|---|
| 2014/0143970 | A1* | 5/2014 | Baumert | ............... B60S 1/3853 15/250.32 |
| 2015/0013094 | A1 | 1/2015 | Avasiloaie | |
| 2015/0074935 | A1 | 3/2015 | An et al. | |
| 2017/0036648 | A1* | 2/2017 | Ku | ....................... B60S 1/3801 |

FOREIGN PATENT DOCUMENTS

| | | | | |
|---|---|---|---|---|
| EP | 2450244 | A1 | 5/2012 | |
| JP | 2003312451 | A * | 11/2003 | .............. B60S 1/386 |
| KR | 101126724 | * | 3/2012 | |
| KR | 101426005 | B1 * | 7/2014 | |
| WO | WO-2013010825 | A1 * | 1/2013 | .............. B60S 1/381 |

OTHER PUBLICATIONS

Machine language translation of description portion of KR publication 10-1426005, published Jul. 2014. (Year: 2014).*
Machine translation of description portion of CN publication 201249748, published Jun. 2009. (Year: 2009).*
Search Report dated Jan. 11, 2024 of the corresponding European patent application No. 23187085.8.

* cited by examiner

BONELESS WIPER STRUCTURE

BACKGROUND OF THE INVENTION

Technical Field

The present disclosure relates to a wiper structure and in particular to, a boneless wiper structure.

Description of Related Art

Boneless windshield wipers eliminate the drawbacks of related-art wipers by omitting metal frames, which enables wiper blades to have uniform force distribution. This results in evenly distributed pressure and enables the wiper blade to stably contact a vehicle's windshield glass.

However, with modern trends toward simple assembly and wide applicability, wiper manufacturers aim to reduce assembly components and secure boneless wipers onto various types of wiper arms.

In light of the above, the inventor of the present disclosure has devoted himself to doing research and studying scientific principles so as to solve the above problem of related-art techniques.

SUMMARY OF THE INVENTION

The present disclosure provides a boneless wiper structure. The boneless wiper structure includes a wiper blade with two positioning holes disposed on the middle portion and arranged opposite to each other on the left and right, and two positioning feet extend from a bottom of the fixing base to be engaged with the two positioning holes. The boneless wiper structure of the present disclosure has an advantage of reducing assembly components.

One embodiment of the present disclosure provides a boneless wiper structure for a wiper arm. The boneless wiper structure includes: a wiper blade, wherein a middle portion of the wiper blade is provided with two positioning holes defined opposite to each other on a left side and a right side; and a connection base assembly. The connection base assembly includes: a fixing base assembled to the wiper blade, wherein two positioning feet extend from a bottom of the fixing base and are engaged with the two positioning holes, and a top of the fixing base is provided with a containing groove and a first engagement groove and a second engagement groove arranged on a front side and a rear side of the containing groove; and a joint base engaged with the containing groove, wherein a block extends from one end of the joint base and is engaged with the first engagement groove, an elastic fastening arm extends from another end of the joint base and is engaged with the second engagement groove, a recessed groove is defined on a top of the joint base, and one end of the wiper arm is accommodated in the recessed groove and is pivotally connected to the joint base.

Accordingly, the fixing base is directly positioned in the middle of the wiper blade. Compared with related-art techniques, the boneless wiper structure of the present disclosure omits positioning elements. Therefore, the present disclosure has the advantage of reducing assembly components.

DETAILED DESCRIPTION

Figure 1:
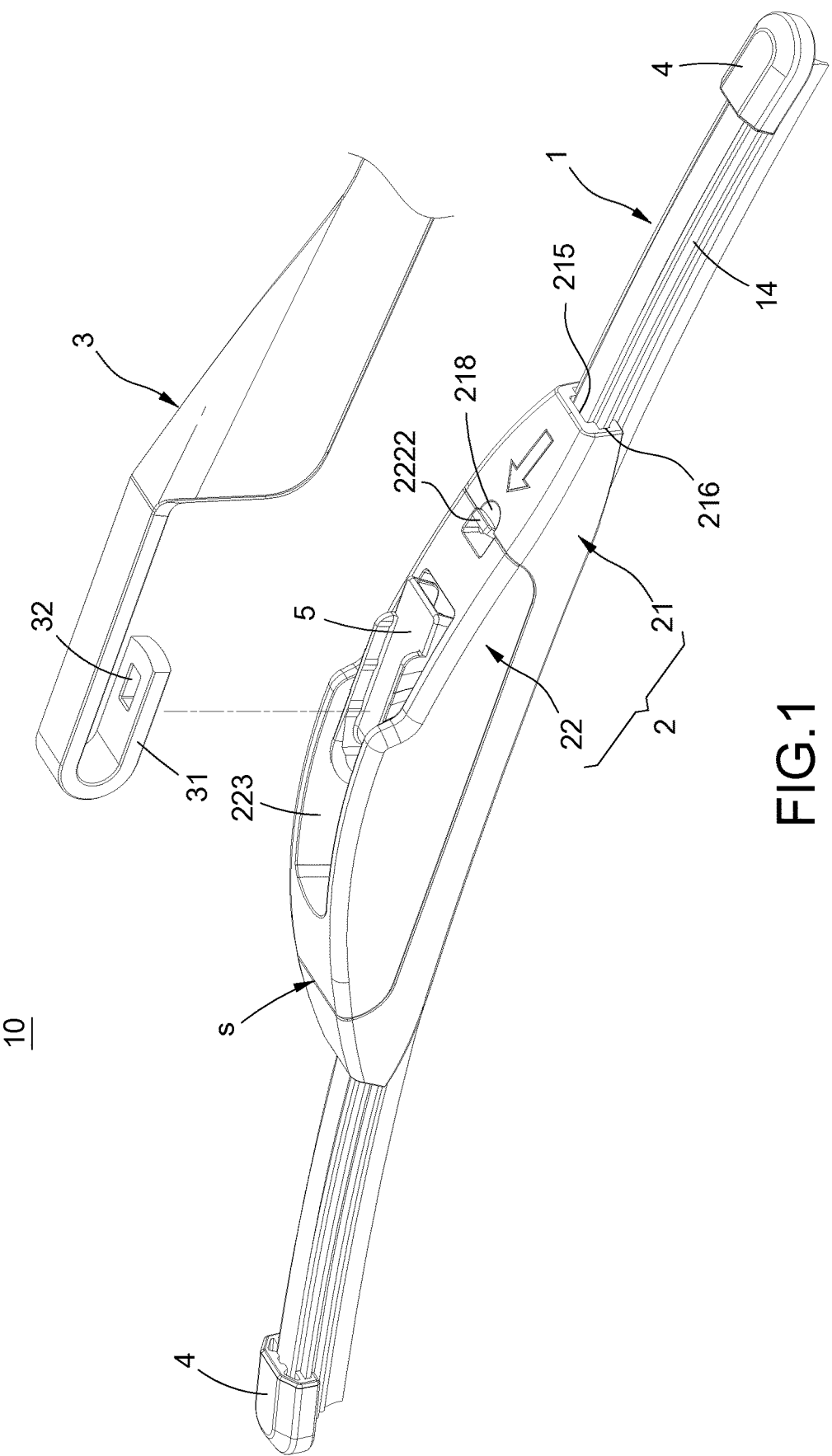
FIG. 1 is a perspective exploded view of a boneless wiper structure of the present disclosure.
Figure 2:
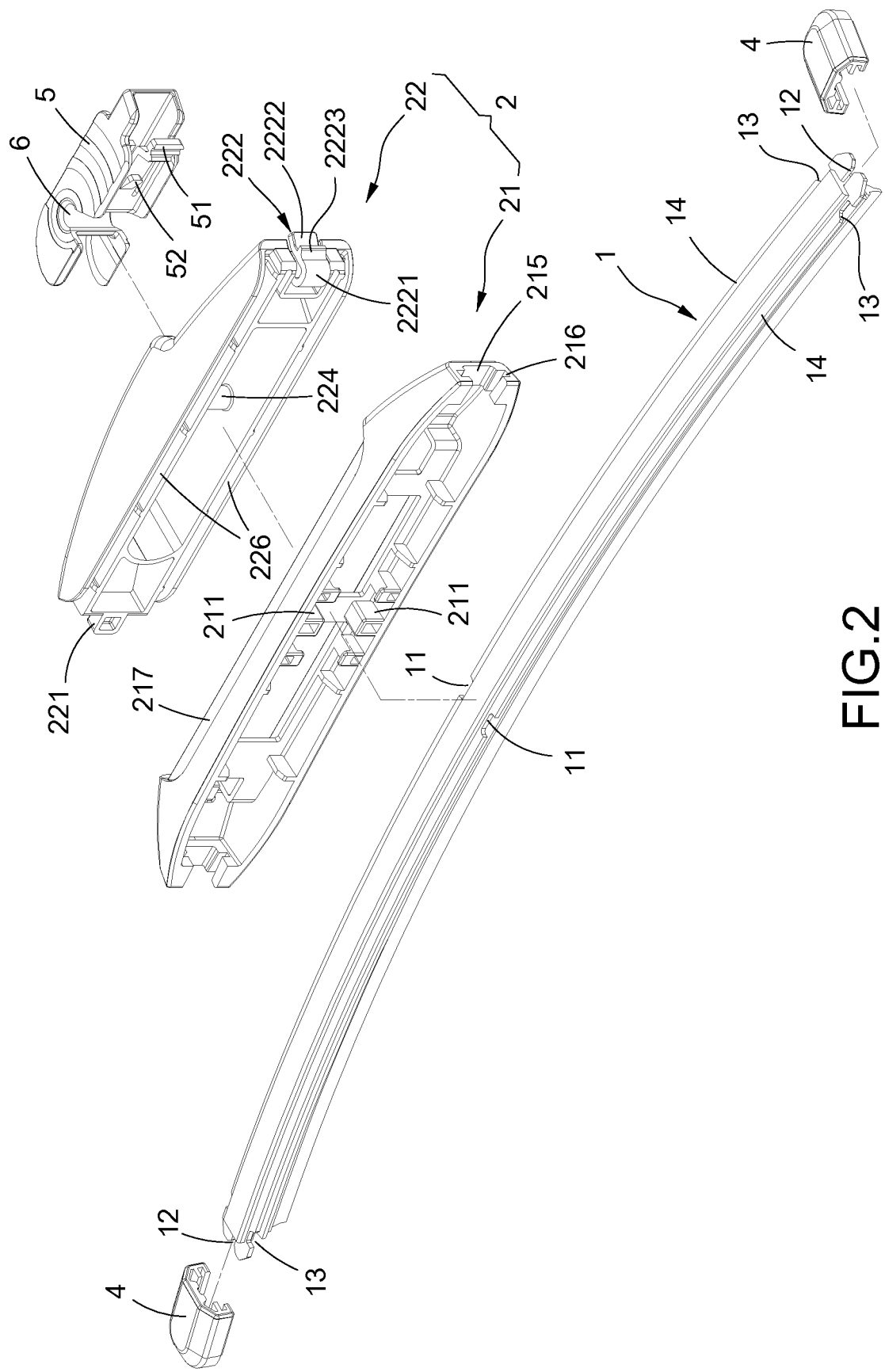
FIG. 2 is a perspective exploded view illustrating a wiper blade, a connection base assembly, and a connecting element of the present disclosure.
Figure 3:
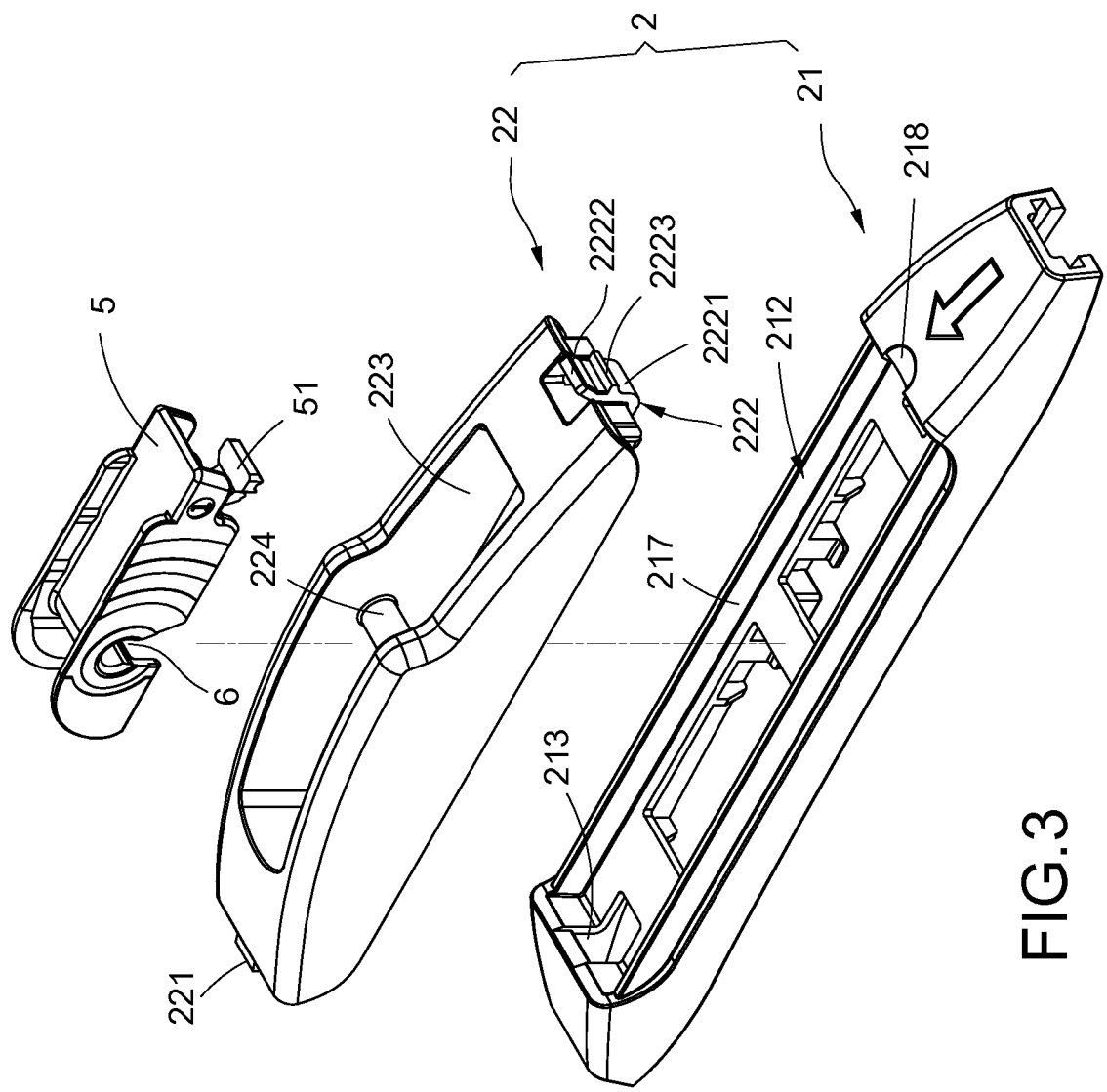
FIG. 3 is a perspective exploded view illustrating the connection base assembly and the connecting element of the present disclosure.
Figure 4:
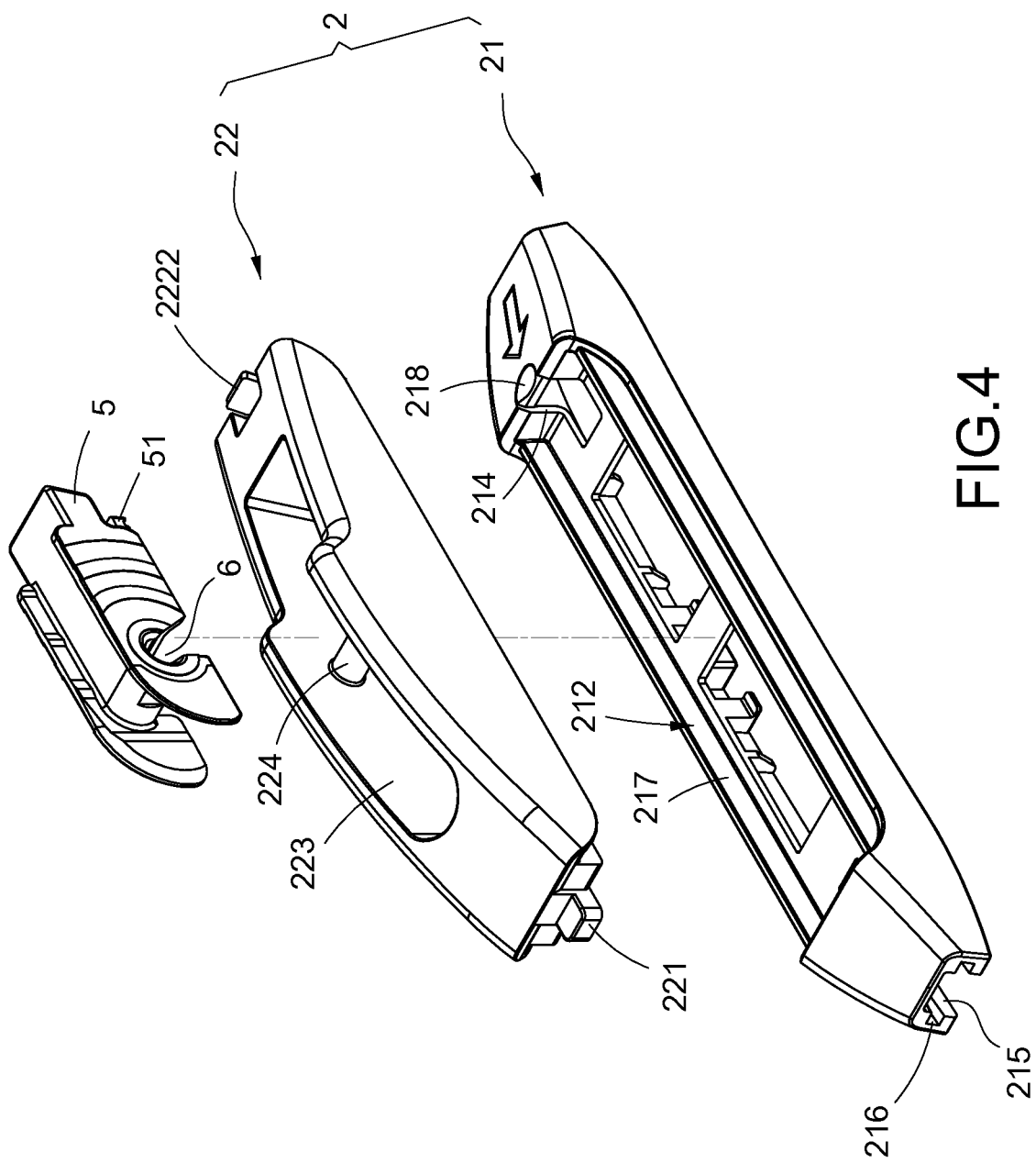
FIG. 4 is a perspective exploded view illustrating the connection base assembly and the connecting element of the present disclosure.
Figure 5:
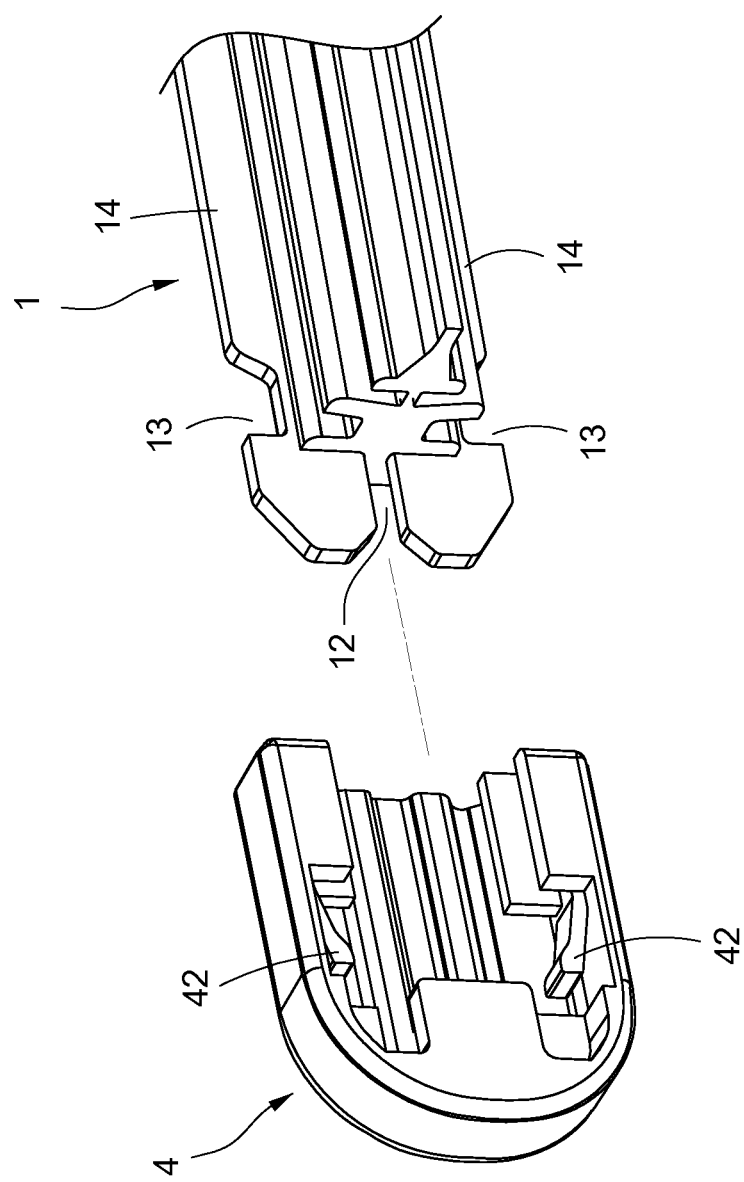
FIG. 5 is a perspective exploded view illustrating an end protection cover and the wiper blade of the present disclosure.
Figure 6:
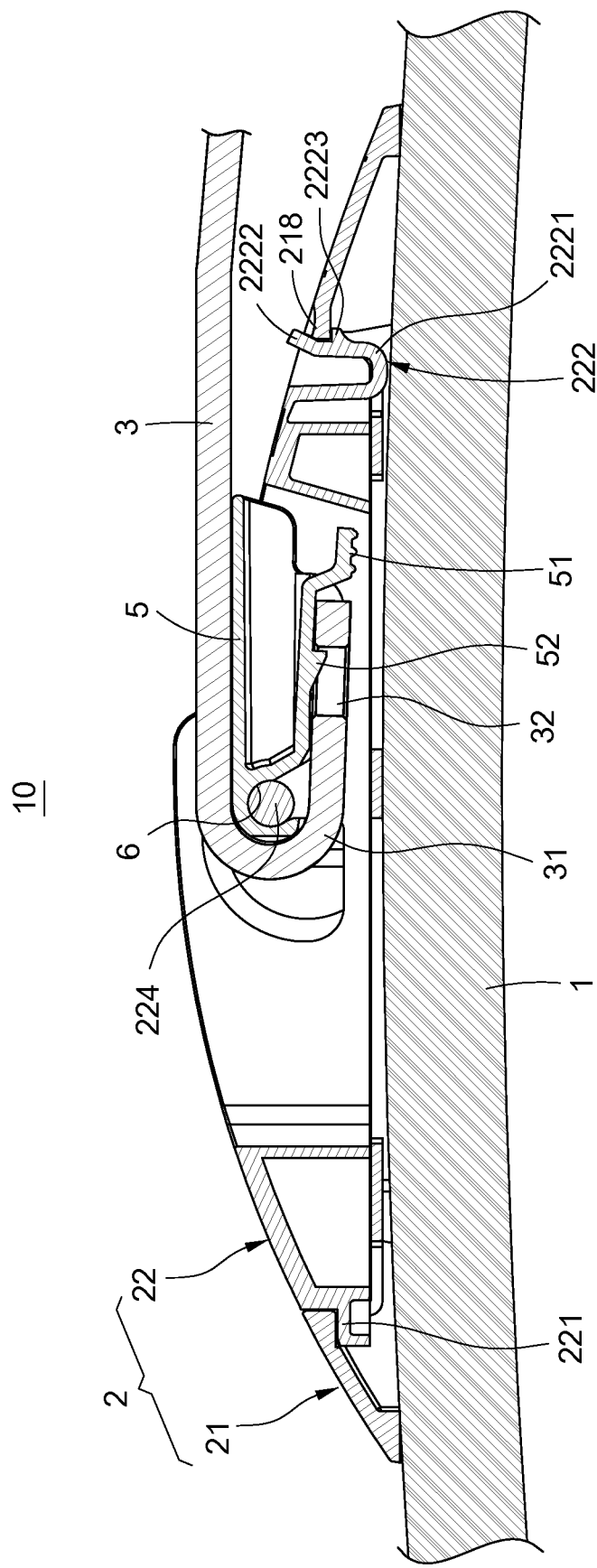
FIG. 6 is a partially cross-sectional view of the boneless wiper structure of the present disclosure.
Figure 7:
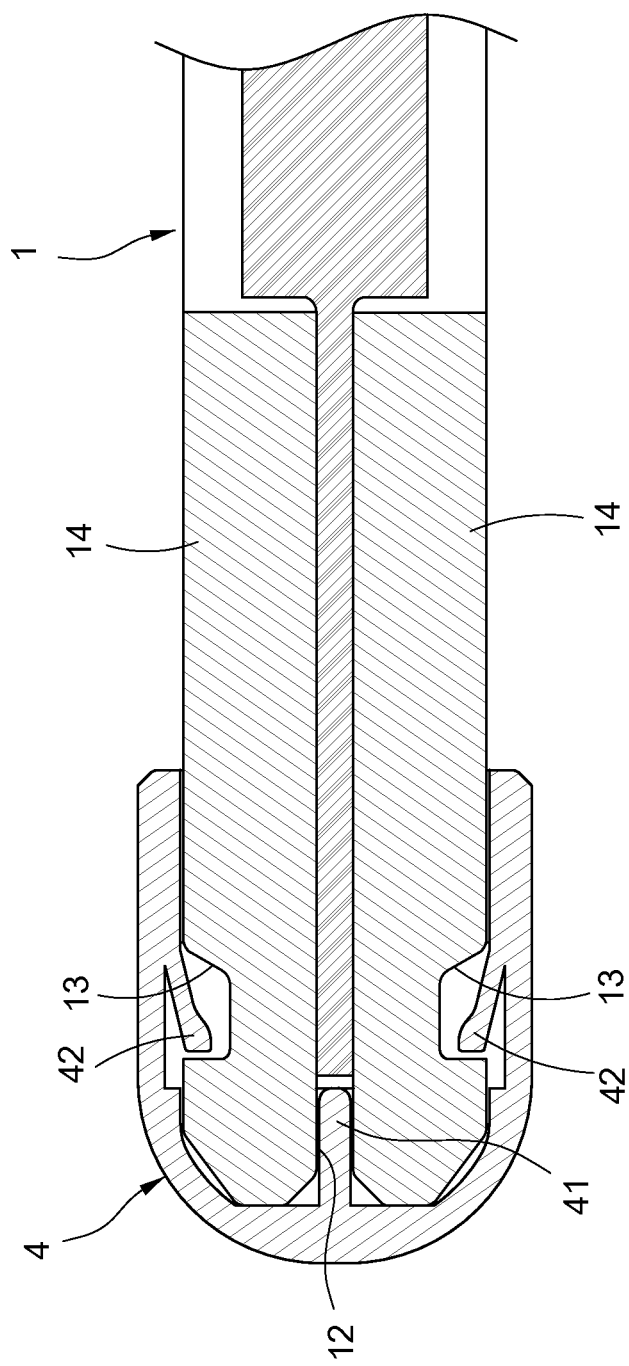
FIG. 7 is another partially cross-sectional view of the boneless wiper structure of the present disclosure.

The technical solution of the present disclosure is detailed below with reference to accompanying drawings. However, the accompanying drawings are only for illustration purposes and are not intended to limit the present disclosure.

Please refer to FIGS. 1, 2, 3, 4, 5, 6, and 7. The present disclosure provides a boneless wiper structure for a wiper arm 3. The boneless wiper structure 10 mainly includes a wiper blade 1 and a connection base assembly 2.

As shown in FIGS. 1, 2 and FIGS. 5, 6, and 7, the wiper blade 1 is provided with two positioning holes 11 disposed on the middle portion and arranged opposite to each other on the left and right. In the present embodiment, the two positioning holes 11 are two through holes recessed inward from left and right sides of the wiper blade 1. The present disclosure is not limited in this regard.

In addition, an outer periphery of each end of the wiper blade 1 is provided with a strip groove 12 and two notches 13 arranged on left and right sides of the strip groove 12. Two protruding bars 14 extend from the left and right sides of the wiper blade 1.

As shown in FIGS. 1, 2, 3, 4, 5, 6, and 7, the connection base assembly 2 includes a fixing base 21 and a joint base 22. The fixing base 21 is assembled to the wiper blade 1. Two positioning feet 211 extend from a bottom of the fixing base 21 to be engaged with the two positioning holes 11. A top of the fixing base 21 is provided with a containing groove 212, and a first engagement groove 213 and a second engagement groove 214 arranged on a front side and a rear side of the containing groove 212.

A through indentation 215 is defined on the bottom of the fixing base and penetrates through a front side and a rear side of the fixing base 21. An inner surface of the through indentation 215 is provided with two trenches 216 arranged on opposite sides. The wiper blade 1 is inserted in the through indentation 215, and the two protruding bars 14 are engaged with the two trenches 216, so that the wiper blade 1 is firmly engaged with the bottom of the fixing base 21. The fixing base 21 extends with two transverse ribs 217 accommodated in the containing groove 212 and arranged opposite to each other on left and right sides.

Furthermore, the joint base 22 is engaged with the containing groove 212. A block 221 extends from one end of the joint base 22 and is engaged with the first engagement groove 213. An elastic fastening arm 222 extends from another end of the joint base 22 and is engaged with the second engagement groove 214. A bottom of the joint base 22 is provided with two transverse grooves 226 arranged opposite to each other on left and right sides, and the two transverse ribs 217 are engaged with the two transverse grooves 226, so that the joint base 22 is firmly engaged with the top of the fixing base 21.

In detail, an elastic fastening arm 222 includes an inverted U-shaped spring arm 2221, a triggerable end 2222 disposed at an end of the inverted U-shaped spring arm, and a latch 2223 protruding from the inverted U-shaped spring arm 2221. The latch 2223 is engaged with the second engagement groove 214. Therefore, the triggerable end 2222 may be triggered (pulled) to remove the latch 2223 from the second engagement groove 214, so as to disengage the joint base 22 from the fixing base 21.

A recessed groove 223 is defined on a top of the joint base 22. The joint base 22 has a pivot shaft 224 crossing from a left inner wall to a right inner wall of the recessed groove 223. A top of the fixing base 21 is provided with a cavity 218 defined at an edge of the containing groove 212 and arranged corresponding to the triggerable end 2222.

A surface of the fixing base 21 and a surface of the joint base 22 are smoothly connected to each other to form a continuous smooth surface s. That is to say, a junction of the fixing base 21 and the joint base 22 is a smooth and non-step surface, and the continuous smooth surface s may guide rainwater to slide down to avoid accumulation of rainwater.

Referring to FIGS. 1, 2, 5, and 7, the boneless wiper structure 10 further includes two end protection covers 4. The two-end protection covers 4 sheathe two ends of the wiper blade 1 to enhance structural strength of the ends of the wiper blade 1.

Furthermore, each of the end protection covers includes a straight rib 41 extending internally and two flexible hooks 42 disposed on left and right sides of the straight rib 41. A spacing between the two flexible hooks 42 reduces in a direction toward the end of the wiper blade 1. Each of the straight ribs 41 is embedded into each of the strip grooves 12, and the two flexible hooks 42 are engaged with the two notches 13 respectively, so that each end protection cover 4 is securely installed on each end of the wiper blade 1.

As shown in FIGS. 1, 2, 3, 4, and 6, the boneless wiper structure 10 of the present disclosure further includes a connecting element 5. One end of the wiper arm 3 includes a U-shaped bent section 31, the U-shaped bent section 31 is provided with a concave portion 32, the connecting element 5 includes a C-shaped pivot hole 6 and a triggerable tab 51 extending from the connecting element 5, the triggerable tab 51 includes a protruding portion 52, the pivot shaft 224 is pivoted in the C-shaped pivot hole 6, the U-shaped bent section 31 encloses and covers the connecting element 5, and the protruding portion 52 is engaged with the concave portion 32, so that one end of the wiper arm 3 is accommodated in the recessed groove 223 and pivotally connected to the joint base 22.

Moreover, when the triggerable tab 51 is triggered (pulled), the triggerable tab 51 drives the protruding portion 52 to be disengaged from the concave portion 32, so that the wiper arm 3 and the connecting element 5 are detached from each other, and thus the wiper arm 3 may be detached from the joint base 22.

In related-art techniques, a positioning member is installed on the middle of a wiper blade, and a fixing base is assembled with the positioning member, so that the wiper blade is installed on the bottom of the fixing base, and the fixing base is positioned in the middle of the wiper blade.

FIGS. 1, 2, 3, 4, 5, 6, and 7 illustrate that the boneless wiper structure 10 of the present disclosure has a use state in which the wiper blade 1 is provided with two positioning holes 11 in the middle and arranged opposite to each other on the left and right, and two positioning feet 211 extend from the bottom of the fixing base 21 to be engaged with the two positioning holes 11, so that the fixing base 21 is securely positioned in the middle of the wiper blade 1. Accordingly, the fixing base 21 may be directly positioned in the middle of the wiper blade 1. Compared with related-art techniques, the present disclosure omits a positioning member. Hence, the boneless wiper structure 10 of the present disclosure has the advantage of reducing the assembly components.

In addition, because the joint base 22 and the fixing base 21 of the connection base assembly 2 are two separate components, users may change the joint base 22 or may choose the connecting element 5 according to a type of the wiper arm 3, so as to enable the boneless wiper structure 10 of the present disclosure to be securely fastened to various types of wiper arms 3.

Figure 8:
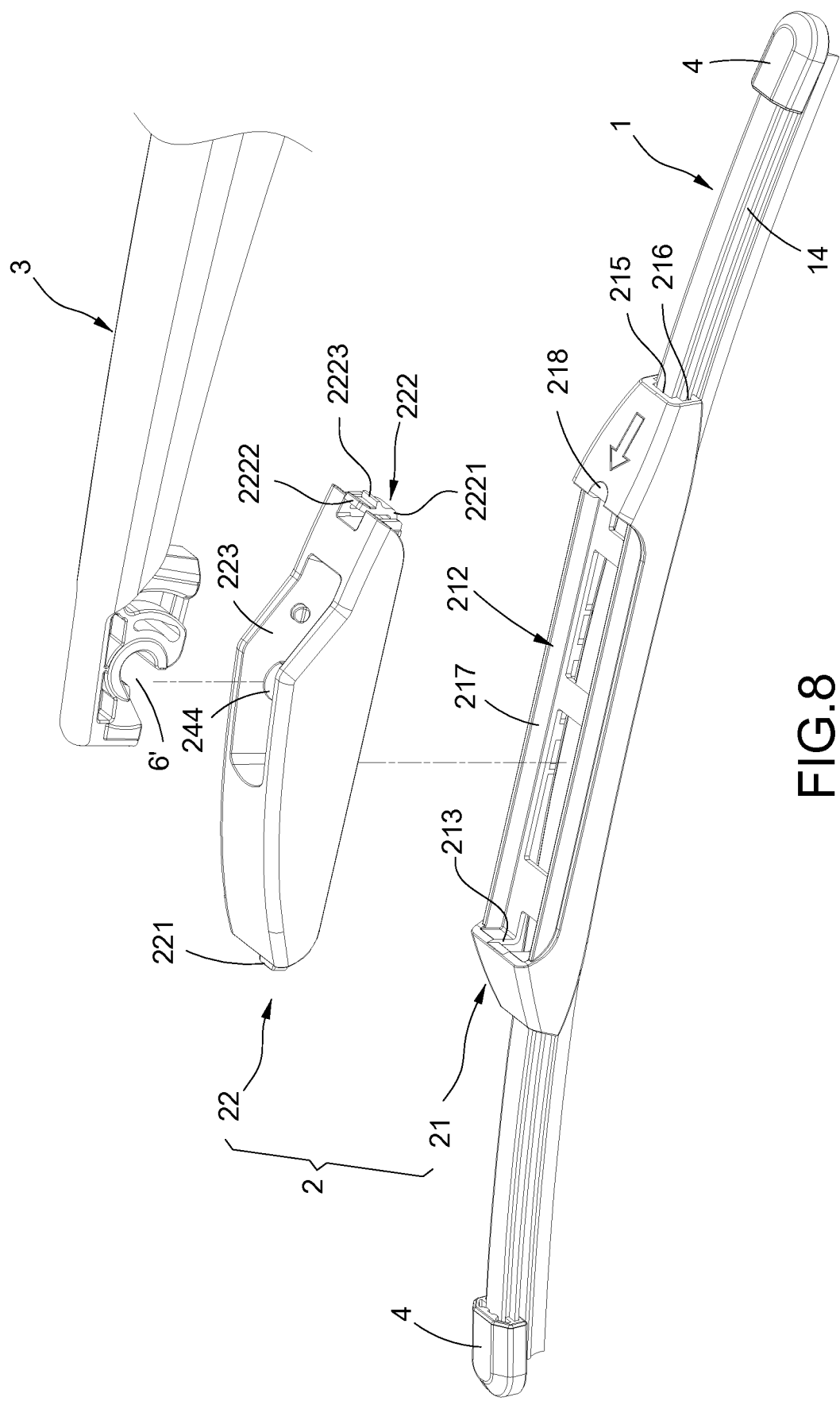
FIG. 8 is a perspective exploded view illustrating the boneless wiper structure according to another embodiment of the present disclosure.

Please refer to FIG. 8, which shows the boneless wiper structure 10 according to another embodiment of the present disclosure. The embodiment of FIG. 8 is substantially the same as the embodiment of FIGS. 1, 2, 3, 4, 5, 6, and 7. The embodiment of FIG. 8 is different from the embodiment of FIGS. 1, 2, 3, 4, 5, 6, and 7 in that the C-shaped pivot hole 6' is open on one end of the wiper arm 3, and the pivot shaft 224 is pivotally connected to the C-shaped pivot hole 6' of the wiper arm 3, so that one end of the wiper arm 3 is accommodated in the recessed groove 223 and pivotally connected to the joint base 22.

What is claimed is:

1. A boneless wiper structure comprising:
a wiper arm (3);
a wiper blade (1), comprising two positioning holes (11) defined on a middle portion thereof opposite to each other, and two protruding bars (14) extended from opposite sides thereof, wherein the two positioning holes (11) are two through holes recessed inward from two sides of the two protruding bars (14); and
a connection base assembly (2), comprising:
a fixing base (21), assembled to the wiper blade (1), comprising two positioning feet (211) extended from a bottom thereof and engaged with the two positioning holes (11), a through indentation (215) defined on the bottom thereof and penetrating through a front side and a rear side thereof, a containing groove (212) defined on a top thereof, and a first engagement groove (213) and a second engagement groove (214) arranged on a front side and a rear side of the containing groove (212), wherein two trenches (216) are oppositely defined on an inner surface of the through indentation (215), the wiper blade (1) is inserted in the through indentation (215), and the two protruding bars (14) are engaged with the two trenches (216); and
a joint base (22), engaged with the containing groove (212), comprising a block (221) extended from one end thereof and engaged with the first engagement groove (213), an elastic fastening arm (222) extended from another end thereof and engaged with the second engagement groove (214), and a recessed groove (223) defined on a top thereof, wherein one end of the wiper arm (3) is accommodated in the recessed groove (223) and pivotally connected to the joint base (22);

wherein the elastic fastening arm (222) comprises an inverted U-shaped spring arm (2221), a triggerable end (2222) and a latch (2223), the inverted U-shaped spring arm (2221) comprises a first connecting section, a U-shaped lower portion, and a second connecting section, the U-shaped lower portion is U-shaped, two ends of the U-shaped lower portion are respectively connected to the first connecting section and the second connecting section, the first connecting section is extended from the joint base (22) toward the second engagement groove (214) of the fixing base (21), the U-shaped lower portion is extended from an end of the first connecting section and penetrates the second engagement groove (214) to be configured to move in a space defined between the wiper blade (1) and the fixing base (21), the second connecting section is extended from the U-shaped lower portion along a direction away from the second engagement groove (214), the triggerable end (2222) is formed on an end of the second connecting section and protrudes to an outer side of the fixing base (21), the latch (2223) is convex from the second connecting section to penetrate the second engagement groove (214) to abut against an inner side of the fixing seat (21).

2. The boneless wiper structure according to claim 1, further comprising two end protection covers (4) adapted to sheathe two ends of the wiper blade (1).

3. The boneless wiper structure according to claim 2, wherein the wiper blade (1) comprises a strip groove (12) defined on an outer periphery of an end thereof and two notches (13) arranged on opposite sides of the strip groove (12), each of the end protection covers (4) comprises a straight rib (41) extended inside and two flexible hooks (42) disposed on opposite sides of the straight rib (41), a spacing between the two flexible hooks (42) gradually reduces in a direction toward the end of the wiper blade (1), the straight rib (41) is embedded in the strip groove (12), and the two flexible hooks (42) are engaged with the two notches (13) respectively.

4. The boneless wiper structure according to claim 1, wherein the fixing base (21) comprises a cavity (218) defined on a top thereof and located at an edge of the containing groove (212) corresponding to the triggerable end (2222).

5. The boneless wiper structure according to claim 1, wherein a surface of the fixing base (21) and a surface of the joint base (22) are connected to each other in a continuous smooth surface(s) manner.

6. The boneless wiper structure according to claim 1, wherein the fixing base (21) comprises two transverse ribs (217) accommodated in the containing groove (212) and arranged opposite to each other, the joint base (22) comprises two transverse grooves (226) defined on a bottom thereof opposite to each other, and the two transverse ribs (217) are engaged with the two transverse grooves (226).

7. The boneless wiper structure according to claim 1, further comprising a connecting element (5), wherein the joint base (22) comprises a pivot shaft (224) crossing opposite inner walls of the recessed groove (223), the wiper arm (3) comprises a U-shaped bent section (31) disposed on one end thereof, the U-shaped bent section (31) comprises a concave portion (32), the connecting element (5) comprises a C-shaped pivot hole (6) and a triggerable tab (51) extended therefrom, the triggerable tab (51) comprises a protruding portion (52), the pivot shaft (224) is connected pivotally with the C-shaped pivot hole (6), the U-shaped bent section (31) is adapted to sheathe the connecting element (5), and the protruding portion (52) is engaged with the concave portion (32).

8. The boneless wiper structure according to claim 1, wherein the joint base (22) comprises a pivot shaft (224) crossing opposite inner walls of the recessed groove (223), the wiper arm (3) comprises a C-shaped pivot hole (6') disposed on one end thereof, and the pivot shaft (224) is pivotally connected to the C-shaped pivot hole (6').

* * * * *